United States Patent [19]

Altshuler

[11] 4,386,274
[45] May 31, 1983

[54] ISOTOPE SEPARATION BY STANDING WAVES

[76] Inventor: Saul Altshuler, 608 Fifteenth St., Manhattan Beach, Calif. 90266

[21] Appl. No.: 205,842

[22] Filed: Nov. 10, 1980

[51] Int. Cl.³ .............................................. H01J 39/34
[52] U.S. Cl. .................................................. 250/251
[58] Field of Search ............................ 250/251, 423 P

[56] References Cited

U.S. PATENT DOCUMENTS

| | | | |
|---|---|---|---|
| 3,532,879 | 10/1970 | Hall et al. | 250/41.9 |
| 3,558,877 | 1/1971 | Pressman | 250/251 |
| 3,778,612 | 12/1973 | Ashkin | 250/251 |
| 4,025,787 | 5/1977 | Janner et al. | 250/251 |

OTHER PUBLICATIONS

Cook, et al., *Physical Review A*, vol. 18, No. 4, pp. 2533-2537.

Arimondo, et al., *Physical Review Letters*, vol. 43, No. 11, of Sep. 10, 1979, pp. 753-757.
"Laser Separation of Isotopes", Zare, *Sci. American*, Feb. 1977, pp. 86-98.

*Primary Examiner*—Bruce C. Anderson
*Attorney, Agent, or Firm*—Edwin A. Oser

[57] ABSTRACT

The separation of isotopes is accomplished by scattering a beam of particles from a standing electromagnetic wave. The particles may consist of either atoms or molecules, each having a desired isotope and at least one other. The particle beam is directed in a normal direction against the standing wave, which may be a light wave. The particles; that is, the atomic or molecular quantum-mechanical waves, see basically a diffraction grating corresponding to the troughs and peaks of the electromagnetic wave. The frequency of the electromagnetic wave substantially corresponds to an internal energy level-transition of the desired isotope. Accordingly, the desired isotope is spatially separated by being scattered or diffracted.

17 Claims, 4 Drawing Figures

ISOTOPE SEPARATION BY STANDING WAVES

BACKGROUND OF THE INVENTION

Presently many methods and apparatuses are known for separating a desired isotope from one or more others. A presently used commercial process utilizes gaseous diffusion whereby the isotopes are separated by their mass differences. Another commercial process utilizes separation of the isotopes by centrifugal force.

Other promising approaches are the Dawson process, as exemplified by U.S. Pat. No. 4,059,761 to John M. Dawson. Here the isotopes are differentially energized in a dense plasma by stimulating them by a resonant frequency. Another promising approach is the one jointly carried out by Jersey Nuclear-Avco Isotopes, Inc. A representative patent for this approach is U.S. Pat. No. 3,772,519 to Levi, et al. Referring to the patent to Levi, reference is made to a paper entitled, "Laser Separation of Isotopes," by Richard N. Zare, in the *Scientific American* of February, 1977, pp. 86 through 98. Here a desired isotope is ionized by irradiating it with one or more lasers to remove an electron.

Reference is also made to the patent to Braunstein, Altshuler, and Frantz, U.S. Pat. No. 3,532,879. This patent discloses apparatus for deflecting atoms by a standing light wave. However, the neutral particle beam is directed against the electromagnetic standing wave at the Bragg angle. In this connection, reference may also be made to a patent by Altshuler, et al., U.S. Pat. No. 3,761,721. In this patent a beam of particles may be split into two beams by the process disclosed in the prior patent to Braunstein, et al.

The deflection of atoms by a resonant standing electromagnetic wave has been investigated in the recent scientific literature. Thus, a paper by Cook, et al., which appears in *Physical Review A*, Volume 18, No. 6, Dec. 1978, pages 2533 to 2537, is a theoretical study to prove mathematically that such a deflection of atoms is possible. Another paper, by Arimondo, et al., which appears in *Physical Review Letters*, Vol. 43, No. 11, Sept. 10, 1979, pages 753 through 757, relates to a laboratory experiment on a sodium beam to demonstrate the existence of a phenomenon, the phenomenon being that such a particle beam can be diffracted or scattered by a standing wave resonant to the internal excitation level of the atom.

It should be noted that neither of the two publications just referred to suggests the use of this phenomenon for the separation of isotopes; neither does any of the two papers propose that more than a single beam be used.

It is accordingly an object of the present invention to provide a method and apparatus for separating isotopes by generating a beam of particles and separating the desired isotope by scattering or diffracting the beam by a standing electromagnetic wave.

SUMMARY OF THE INVENTION

In accordance with the present invention, a beam of particles is generated, including a desired and at least one other isotope. The particle beam is then collimated to provide a plurality of beamlets having a common origin. These beamlets are now caused to impinge substantially normal to a standing electromagnetic wave. The electromagnetic wave has a frequency which substantially corresponds to the energy of an internal excitation level of a desired isotope. In other words, the standing wave is resonant to an internal excitation level of the desired isotope.

The particles may be either atoms or molecules. In the case of atoms, it may be desirable to curve the standing electromagnetic wave about the circumference of the circle having a center which substantially coincides with the origin of the beamlets. This may, for example, be accomplished by a plurality of prisms interposed into the path of the wave.

In the case of molecules, the standing wave may have a substantial height. That is, the standing wave field may be a sheet of light. This may be accomplished by one or more lasers or a plurality of mirrors which are so disposed that the laser wave is folded back and forth upon itself. The thickness of the electromagnetic wave should be quite thin, in order to produce a large diffraction of the atomic or molecular wave.

The novel features that are considered characteristic of this invention are set forth with particularly in the appended claims. The invention itself, however, both as to its organization and method of operation, as well as additional objects and advantages thereof, will best be understood from the following description when read in connection with the accompanying drawings.

DESCRIPTION OF A PREFERRED EMBODIMENT

Figure 1:
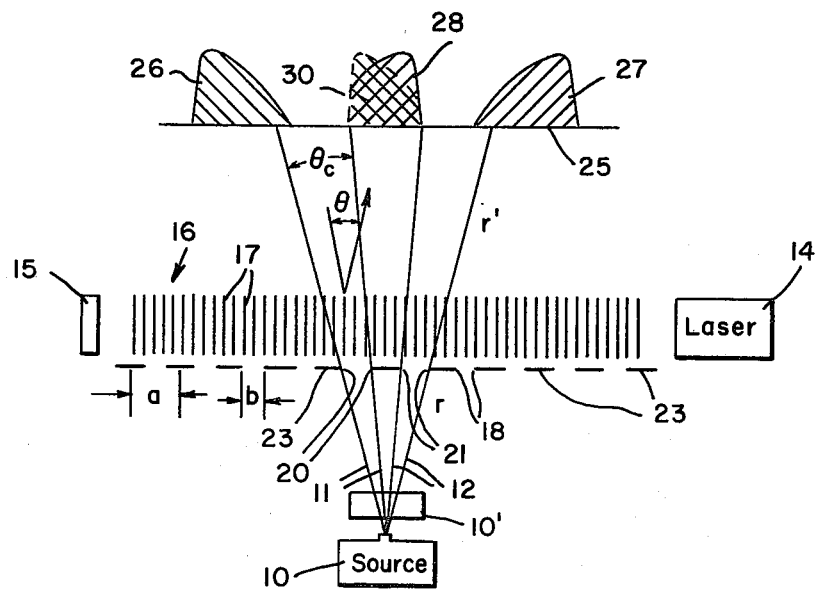
FIG. 1 is a schematic representation of two particle beamlets scattered by a standing electromagnetic wave and showing the intensity of the desired isotope which has been scattered by the standing wave.

Referring now to FIG. 1, there is shown schematically an apparatus for performing the separation process of the present invention. As shown in FIG. 1, there may be provided an oven 10, or alternatively, a supersonic nozzle 10'. The purpose of the oven 10 is to generate a beam of particles as shown at 11 and 12, which spreads substantially linearly, as shown. Generally, when the particle beam consists of atoms, an oven 10 may be preferred. In some cases, particularly in the case of molecules, it may be desired to cool the molecule particle beam by a supersonic nozzle 10'. Of course, it will be understood that when the original material consists of a gas, it may not be necessary to heat the gas. Also, it will be obvious that a vacumm is required so that the particle beam will not spread due to unwanted collisions.

In some conventional manner, for example by the use of a laser 14 and a mirror 15, which should be a totally reflecting mirror, a standing electromagnetic wave 16 may be generated. The laser 14 also includes a reflecting mirror. The vertical lines 17 may, for example, represent the peaks or crests of the standing wave. The standing wave may be a light wave or some other electromagnetic wave, depending on the energy of the internal excitation level of the desired isotope.

The beam 11, 12, is now collimated by providing a plurality of collimating slits 18, 20, 21, which are formed by a plurality of obstructions or baffles 23. As shown in FIG. 1, the width of each slit is b, and the distance between the centers of adjacent baffles 23 is a.

The slit 20 collimates a beamlet 11 which passes to a collector 25, which may simply be a plane sheet of a suitable material. The slit 21 collimates another beamlet 12, impinging on surface 25. FIG. 1 illustrates the intensity distribution 26 of the desired isotope which is scattered by slit 21.

It will be understood that in practice there will be a large number of slits and hence, a large number of beamlets, which of course improves the efficiency of the isotope separation.

The scattered angle $\theta$ is also shown in FIG. 1, as well as the angle $\theta_c$ which is the collimation angle.

The scattering angle varies between $\theta_{min}$ to $\theta_{max}$ where $$\theta_{min} = \theta_{max}/\pi \qquad (1)$$

The letter r indicates the distance between the source 10 and the slits 18, while r' shows the distance between one of the slits to the surface 25.

Figure 2:
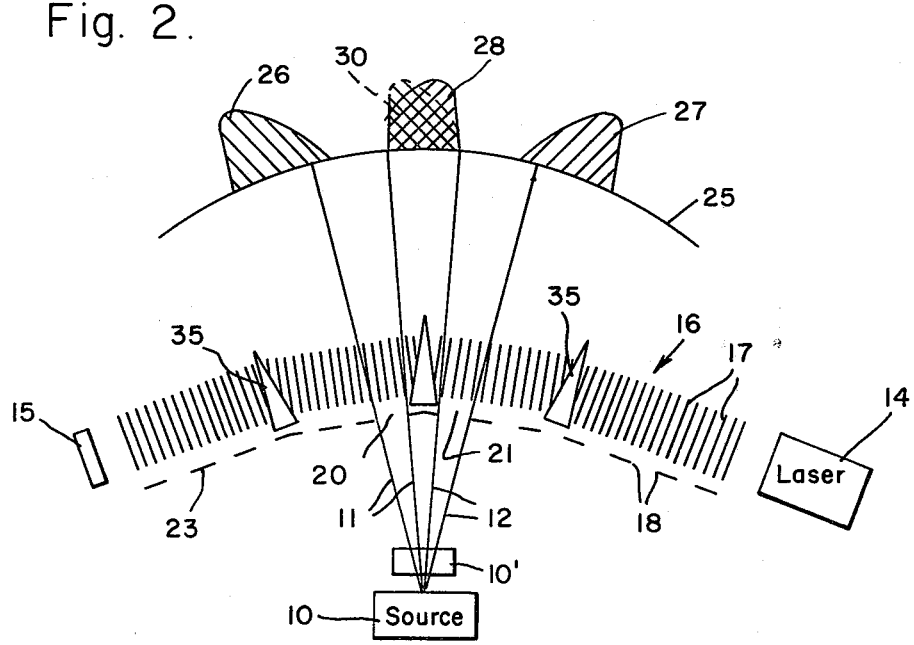
FIG. 2 is a schematic representation similar to that of FIG. 1, but showing the standing wave extending about a circle having its origin in the particle source.

It will be apparent that when a plurality of beamlets, such as 11 and 12, are generated from a single source 10, they will not impinge normal upon the electromagnetic wave 16. In order to overcome this problem, the arrangement of FIG. 2 may be utilized. Here the standing electromagnetic wave 16 is so arranged that it extends along the surface of a circle having its origin at the particle source 10. To this end a plurality of prisms 35 may be introduced into the path of the standing wave 16. There may be as many as 20 prisms. This will insure that every one of the beamlets impinges substantially at right angles upon the wave front. This, in turn, makes it possible to utilize the entire output of the particle source 10. Otherwise, the distribution of the enriched or desired isotope is the same as in FIG. 1. The arrangement of FIG. 2 is particularly suitable for use with a beam of atoms.

Again, the thickness l of the standing wave should be relatively small; that is, the thickness of the wave which the particle beam encounters. This thickness may be calculated by the following formula:

$$l < \lambda_1^2/\lambda_2\phi \qquad (2)$$

where
$\lambda_1$ is the wavelength of the standing wave,
$\lambda_2$ is the wavelength of the particles, such as the atoms, and
$\phi$ is the phase shift of the atomic particle wave moving across the crest of the electromagnetic wave.

In other words, $\phi$ measures the coupling between the atoms and the light field. Again, this relationship is particularly important to achieve the diffraction of atomic or molecular waves.

Figure 3:
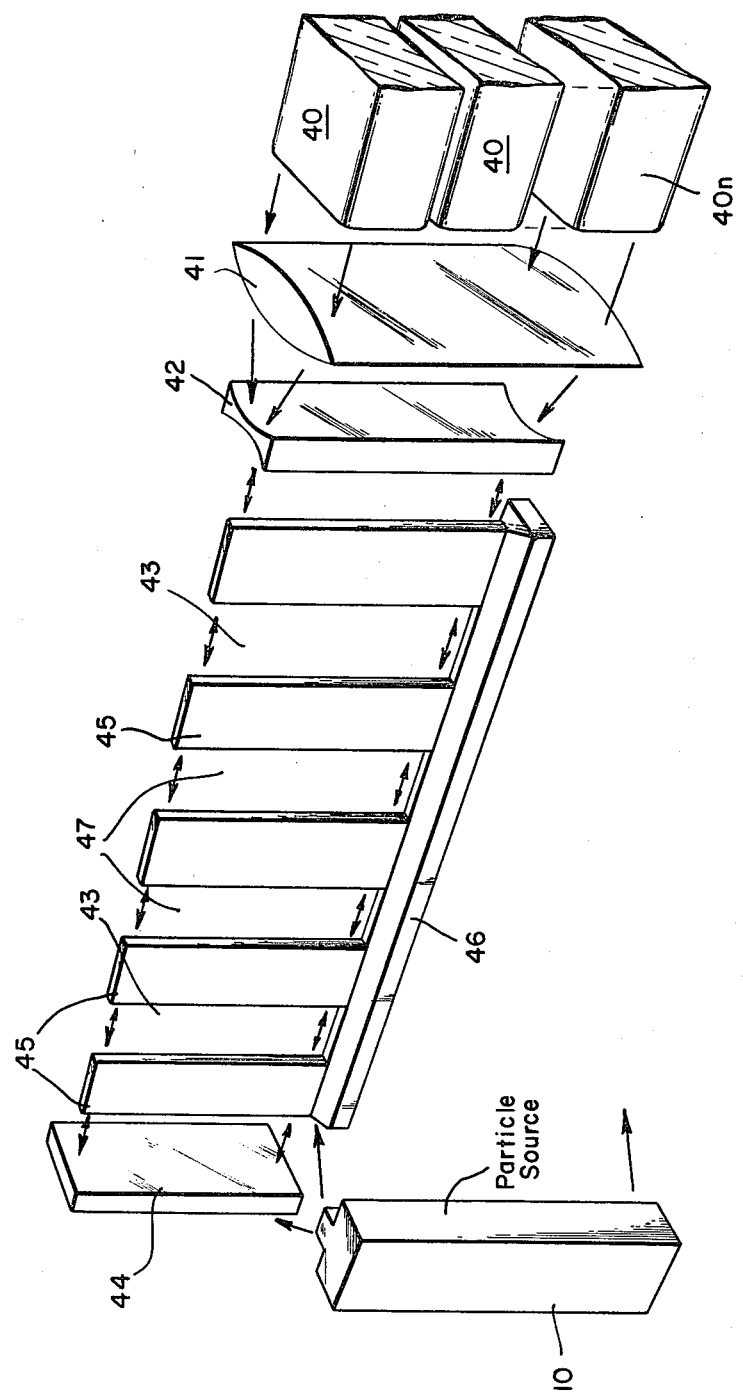
FIG. 3 is a view in perspective of apparatus for more efficiently separating isotopes and which includes a standing wave of substantial dimensions.

FIG. 3, to which reference is now made, shows a more practical embodiment of the apparatus of the present invention. Here the particle source 10 is rather elongated to improve efficiency. The standing light wave may, for example, be generated by one or more stacked lasers 40. The light emitted by the lasers 40 may be focused by a pair of cylindrical lenses 41 and 42; lens 41 being biconvex, while lens 42 is biconcave. The thus generated light sheet 43 is reflected by a totally reflecting mirror 44 to generate the standing wave. It should be noted that the other mirror required for a standing wave is contained within the laser 40. A plurality of baffles 45 may be disposed on a base 46 to form a plurality of slits 47.

By way of example and by means of calculations, it may be shown that $Z = 2r = 20$ cm; thus Z is the length of the standing wave. Accordingly, the distance $r + r' = 20$ cm, which is the distance between the source and the collector. Since $a = 2b$, b may be $2.1 \times 10^{-3}$ cm. This is still an acceptable size for manufacturing, and results in a small energy expenditure per atom. The height of the wave; that is, the height of the atomic beam generated by source 10, may be 10 cm or more. The thickness l of the laser beam may be $5.4 \times 10^{-2}$ cm.

Figure 4:
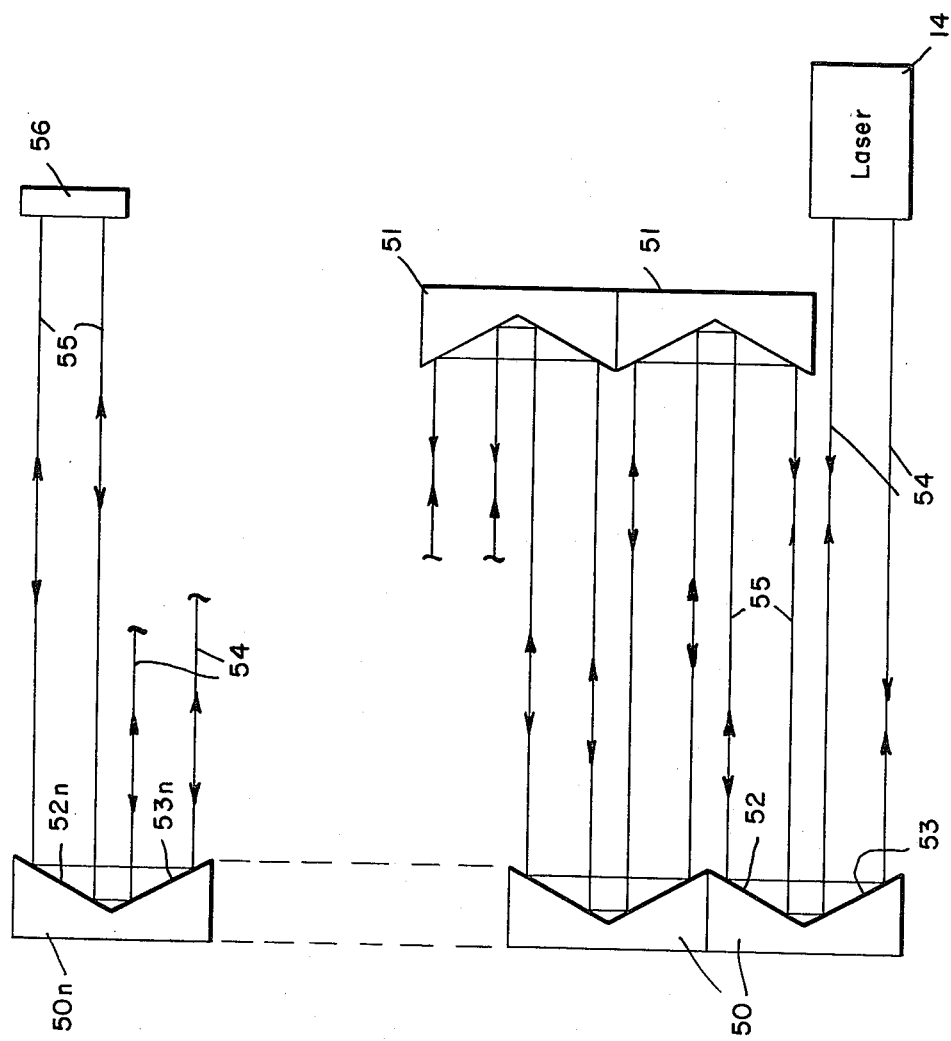
FIG. 4 is a side elevational view of a laser and a plurality of mirrors for folding the path of a standing wave.

In order to obtain such an extended light sheet as shown in FIG. 3, it may be desired to fold a laser beam back and forth upon itself. This has been shown in FIG. 4, to which reference is now made. FIG. 4 again shows a laser 14 and a plurality of mirrors 50, 51, 50n, which are disposed over each other.

Each of the mirrors 50, 51, 50n, etc., consists of two inclined planes 52, 53, 52n, 53n, which reflect the original light beam 54 into a subsequent light beam 55, etc. The last mirror 56 is a plane totally reflecting mirror to return the light beam back to the laser 14. It will be understood that this arrangement may be used to provide the tall light sheet 43 as shown in FIG. 3.

It should be noted that the scattering or diffraction of the particles may be interfered with by the probability of collision between the particles. This effect, however, may readily be controlled by controlling the density of the particle beam or beamlets. It should also be noted that during the process of the invention substantially no photons are consumed. That is, the internal energy state of the desired isotope is not changed; the separation process is substantially elastic.

It should be noted that there are major differences between atomic and molecular isotope separations using the present invention. In the first place, the photon scattering loss of the standing wave is significant for the atom but not for the molecule. Hence, there is a transparency constraint that applies to the atom but does not apply to the molecule. In order to minimize the absorption of photons of light by the atomic particle beamlets, the light should have enough intensity to produce saturation of the atomic transition. It should also be noted that the standing light wave may be slightly off resonance, as long as it does not resonate with an undesired isotope.

The second difference has to do with the interaction time during the transition of the particles through the standing light field. In the atom, the decay time from an upper level into states other than the ground state is short. Therefore, it determines the interaction time of the separation process. Thus, the thickness of the standing wave is commensurate with the distance traveled by an atomic particle during the lifetime of its excited state. This, however, is not true for the molecule, where we are concerned primarily with rotational or vibrational energy levels. Thus, for the molecule the interaction may occur throughout the full transit time through the light field. Since the thickness of the standing wave light field should not be restrained as in the case of the atom, it is the transit time of the molecule which determines the thickness.

In general, it will be necessary to cool the molecules so as to separate the transition lines of the two isotopes. In other words, this will reduce thermal line-broadening effects. For that reason a supersonic nozzle may be used. This may reduce the temperature to, say 55° K., and a carrier gas, such as xenon, may be used.

The last difference between the atom and molecule is that it is not necessary to curve the path of the standing electromagnetic wave for a molecular beam. The reason is that the wavelength of the molecule is on the order of 16 micrometers, which is so long that the resonance line could not be doppler-shifted even if the beam does not impinge normal to the standing wave.

Since the desired or selected isotope is physically or spatially separated from the undesired isotope or isotopes, the physical separation may readily be effected. This may, for example, be effected by cutting out the collimated undesired isotopes from the space, say, between the regions defined by the curve 27-28 or 26-28. The remainder of the surface 25 should then carry primarily the desired isotope which may, for example, be removed by heating.

It should be noted that the separation process of the present invention may be used upon any desired element where the isotopes are to be separated.

Another conventional separation may be that between the uranium isotope 235 from isotope 238. In this case a separation may be carried out either on the atoms U or on the molecule $UF_6$, that is, uranium hexafluoride, or other uranium molecules.

Calculations have been made comparing the energy cost per separated isotope and the product yield for the present invention and for other commercial and highly investigated processes. For a single pass of natural feedstock of uranium, the energy cost per separated atom for the process of the present invention is 76 keV. If the tailings of some other process are used having a 0.3 percent assay of $U^{235}$, to obtain a 3 percent enrichment the energy cost is 120 keV. This compares to an energy cost of the centrifugal process of 300 keV and of 3,000 keV for the gaseous diffusion process, both from natural feedstock. For the Jersey Nuclear-Arco Isotope process, the energy cost starting with natural feedstock is 240 keV.

Thus, the energy cost of the process of the present invention is substantially lower than other processes. In this connection, it should be specifically noted that the process of the present invention will also operate with the tailings of the feedstock of other processes. This permits to regain more $U^{235}$, which would normally be considered a waste product.

The product yield in grams per second of reactor grade uranium for the process of the invention using natural feedstock is $3.3 \times 10^{-3}$ and for the tailings as feedstock having a 0.3 percent assay, the yield sould be $7.2 \times 10^{-4}$ for a single pass. Published figures for the centrifugal process show a product yield of $5 \times 10^{-5}$.

There has thus been disclosed a process and apparatus for separating or enriching a desired isotope from one or more undesired isotopes. The process is relatively simple and does not require a large apparatus. Hence, it could be easily used for processing small amounts of material. The process works for both atoms and molecules, while prior processes operate for either atoms only, or for molecules only. It has been shown that the energy cost per separated isotope is less than that of other known processes and the product yield per separating unit is greater. In particular, it makes it possible to utilize the waste feedstock from other processes to being the amount of $U^{235}$ from 0.3 percent assay, or even lower, to 3 percent enrichment.

What is claimed is:

1. Apparatus for separating isotopes comprising:
   (a) means for generating a beam of particles having a desired and at least one other isotope;
   (b) means for collimating the beam of particles into a plurality of beamlets;
   (c) single means for generating a standing electromagnetic wave extending substantially at right angles to the path of the particles, said electromagnetic wave having a frequency substantially corresponding to an internal excitation level of the desired one of the isotopes, thereby to scatter particles of the desired isotope without substantially exciting the particles after scattering; and
   (d) means for collecting the particles including the desired isotope outside of the path of the collimated particles, the particles forming substantially spatially separated intensity peaks substantially in the plane defined by the particle beam and the electromagnetic wave.

2. Apparatus as defined in claim 1 wherein said particles are atoms.

3. Apparatus as defined in claim 1 wherein said particles are molecules.

4. Apparatus as defined in claim 2 wherein refracting means are provided for curving said standing electromagnetic wave about the circumference of a circle having its center substantially at the origin on the beamlets, thereby to cause said atomic beamlets to impinge upon said wave substantially at right angles.

5. Apparatus as defined in claim 4 wherein said means for curving consists of a plurality of prisms interposed into the path of the standing electromagnetic wave.

6. Apparatus as defined in claim 2 wherein the thickness of the electromagnetic wave is commensurate with the distance travelled by an atomic particle during its excited state lifetime.

7. Apparatus as defined in claim 3 wherein said standing electromagnetic wave has a height comparable to the length of the particle beam and disposed normal to the particle beam.

8. Apparatus as defined in claim 7 wherein said means for generating an electromagnetic wave includes a single laser and a plurality of mirrors so disposed to reflect the standing laser wave back and forth to obtain a wave having a substantial height.

9. The method of separating isotopes from each other comprising the steps of:
   (a) generating a beam of particles including a desired and at least one other isotope;
   (b) collimating the beam of particles into a plurality of beamlets;
   (c) generating a standing electromagnetic wave by a single source and extending substantially normal to the path of the beam of particles, the wave having a frequency substantially corresponding to an internal excitation level of the desired one of the isotopes, thereby to scatter particles of the desired isotope without substantially exciting the particles after scattering and to spatially separate the desired isotopes from other isotopes into substantially separate intensity peaks substantially in the plane defined by the particle beam and the electromagnetic wave; and
   (d) collecting the scattered particles.

10. The method defined in claim 9 wherein said beam of particles consists of atoms.

11. The method defined in claim 9 wherein said beam of particles consists of molecules.

12. The method defined in claim 10 wherein the standing electromagnetic wave is refracted to form a portion of a circle having its center substantially in the origin of the beamlets, whereby the atoms impinge substantially normal to the standing electromagnetic wave.

13. The method defined in claim 10 wherein the thickness of the electromagnetic wave is commensurate with the distance traveled by an atomic particle during its excited state lifetime.

14. The method defined in claim 11 wherein the standing wave is reflected to a height normal to the direction of the particle beam and comparable to the height of its particle beam.

15. The method defined in claim 9 wherein the standing electromagnetic wave is a monochromatic wave.

16. Apparatus for separating isotopes comprising:
 (a) means for generating a beam of molecular particles having a desired and at least one other isotope;
 (b) means for collimating the beam of molecular particles into a plurality of beamlets;
 (c) means for generating a standing electromagnetic wave extending substantially at right angles to the path of the particles, said electromagnetic wave having a frequency substantially corresponding to an internal excitation level of the desired one of the isotopes, the thickness of the electromagnetic wave being less than substantially $\lambda_1^2/\lambda_2\phi$ where $\lambda_1$ is the wavelength of said wave, $\lambda_2$ is the wavelength of the molecular particles and $\phi$ is the phase shift of the molecular wave across a crest of said wave, thereby to scatter molecules of the desired isotope; and
 (d) means for collecting the molecules, including the desired isotope, outside of the path of the collimated particles.

17. The method of separating isotopes from each other comprising the steps of:
 (a) generating a beam of molecular particles including a desired and at least one other isotope;
 (b) collimating the beam of particles into a plurality of beamlets;
 (c) generating a standing electromagnetic wave extending substantially normal to the path of the beam of particles, the wave having a frequency substantially corresponding to an internal excitation level of the desired one of the isotopes, the thickness of the electromagnetic wave being less than substantially $\lambda_1^2/\lambda_2\ \phi$ where $\lambda_1$ is the wavelength of said wave, $\lambda_2$ is the wavelength of the molecular particles and $\phi$ is the phase shift of the molecular wave across a crest of said wave, thereby to scatter molecules of the desired isotope, and
 (d) collecting the scattered molecules.

* * * * *